United States Patent
Sandner et al.

(10) Patent No.: US 8,231,802 B2
(45) Date of Patent: Jul. 31, 2012

(54) PREPARATIONS FOR MAKING PLANAR STRUCTURES OIL-REPELLENT AND WATER-REPELLENT, AND USE THEREOF

(75) Inventors: Bernhard Sandner, Geretsried (DE); Gunther Duschek, Benediktbeuren (DE)

(73) Assignee: Rudolf GmbH, Geretsried (DE)

( * ) Notice: Subject to any disclaimer, the term of this patent is extended or adjusted under 35 U.S.C. 154(b) by 1193 days.

(21) Appl. No.: 10/559,463

(22) PCT Filed: May 28, 2004

(86) PCT No.: PCT/EP2004/005783
§ 371 (c)(1),
(2), (4) Date: Mar. 8, 2006

(87) PCT Pub. No.: WO2004/106623
PCT Pub. Date: Dec. 9, 2004

(65) Prior Publication Data
US 2006/0151739 A1    Jul. 13, 2006

(30) Foreign Application Priority Data
Jun. 3, 2003 (DE) ................................. 103 25 094

(51) Int. Cl.
*D06M 15/423* (2006.01)
*D06M 15/643* (2006.01)
*D06M 15/263* (2006.01)
*C11D 3/00* (2006.01)
*C08G 18/00* (2006.01)
*C08G 18/81* (2006.01)
*C08K 5/02* (2006.01)

(52) U.S. Cl. ...... 252/8.62; 8/115.51; 8/115.6; 252/8.61; 528/44; 528/45; 524/462

(58) Field of Classification Search ................. 252/8.62, 252/8.61; 8/115.51, 115.6; 528/44, 45; 524/462
See application file for complete search history.

(56) References Cited

U.S. PATENT DOCUMENTS

| | | | |
|---|---|---|---|
| 2,927,090 A | 3/1960 | Hiestand et al. | |
| 3,486,911 A * | 12/1969 | Goldstein | 106/2 |
| 3,544,537 A | 12/1970 | Brace | |
| 3,920,614 A | 11/1975 | Kirimoto et al. | |
| 4,296,224 A | 10/1981 | Fukui et al. | |
| 5,019,428 A | 5/1991 | Ludemann et al. | |
| 5,047,065 A | 9/1991 | Vogel et al. | |
| 5,153,297 A * | 10/1992 | Munzmay et al. | 528/70 |
| 5,164,252 A | 11/1992 | Henning et al. | |
| 6,048,925 A * | 4/2000 | Titterington et al. | 524/590 |
| 6,080,830 A | 6/2000 | Dirschl et al. | |
| 6,387,999 B1 * | 5/2002 | Dirschl et al. | 524/537 |
| 6,495,624 B1 * | 12/2002 | Brown | 524/462 |
| 6,531,228 B1 * | 3/2003 | Bartelink et al. | 428/423.1 |
| 7,354,458 B2 | 4/2008 | Sandner et al. | |
| 2002/0016433 A1 * | 2/2002 | Keller et al. | 528/10 |
| 2003/0026997 A1 * | 2/2003 | Qiu et al. | 428/423.1 |
| 2003/0136938 A1 * | 7/2003 | Clark et al. | 252/8.62 |

FOREIGN PATENT DOCUMENTS

| | | |
|---|---|---|
| CA | 2 163 169 C | 5/1996 |
| DE | 1 017 133 | 10/1957 |
| DE | 2 358 647 | 5/1974 |
| DE | 2 939 549 | 4/1980 |
| DE | 44 41 418 | 5/1996 |
| DE | 44 41 418 A1 | 5/1996 |
| DE | 100 17 651 | 10/2001 |
| EP | 0 159 117 | 10/1985 |
| EP | 0 314 944 A2 | 10/1988 |
| EP | 0 314 944 A3 | 10/1988 |
| EP | 0 314 944 B1 | 10/1988 |
| EP | 0 314 944 | 5/1989 |
| EP | 0 325 918 | 8/1989 |
| EP | 0 429 983 A2 | 6/1991 |
| EP | 0 490 150 A2 | 6/1992 |
| EP | 0 537 578 A2 | 4/1993 |
| EP | 0 872 503 A1 | 3/1998 |
| EP | 0 872 503 A1 | 10/1998 |
| JP | 59-009271 | 1/1984 |
| WO | WO 99/14422 | 3/1999 |
| WO | WO 00/29663 | 5/2000 |

OTHER PUBLICATIONS

"Rompp Lexikon Chemie" 10th Edition, vol. 2 (1997), pp. 1149 and 1150.
"Rompp Lexikon Chemie" 10th Edition, vol. 2, pp. 1149 and 1150, 1997.
Siefken, "Justus Liebigs Annalen Der Chemie 562. Band" Mono-und Polyisocyanate, 1948, pp. 75-136.
Houben-Weyl, "Methoden Der Organischen Chemie" 1987, vol. E20, pp. 218-268 and pp. 1150-1163.

* cited by examiner

*Primary Examiner* — Lorna M Douyon
*Assistant Examiner* — Tanisha Diggs
(74) *Attorney, Agent, or Firm* — Buchanan Ingersoll & Rooney PC

(57) ABSTRACT

The invention concerns preparations based on water and/or organic solvents and their use as a finish on flat materials. An exemplary preparation includes:

(1) 10-90 percent by weight of a fluorine containing oil- and water-repellent agent,
(2) 10-80 percent by weight of a hydrophobic reaction product(S) obtainable by reacting a component (A) with a partially blocked or non-blocked di-, tri- or polyisocyanate (IC), and
(3) 0-45 percent by weight of a blocked or non-blocked di-, tri- or polyisocyanate.

15 Claims, No Drawings

PREPARATIONS FOR MAKING PLANAR STRUCTURES OIL-REPELLENT AND WATER-REPELLENT, AND USE THEREOF

CROSS REFERENCE TO RELATED APPLICATIONS

The present application claims priority under 35 U.S.C. §371 to International Application No. PCT/EP2004/005783, filed May 28, 2004 and under 35 U.S.C. §119 to German Application No. 103 25 094.8 filed Jun. 3, 2003, the disclosures of which are hereby incorporated by reference in their entireties.

BACKGROUND

The invention relates to preparations (Zu) based on water and/or organic solvents and their use as a finish on flat materials. On application the preparations give the treated flat materials durable oil- and water-repellent properties and a soft hand.

It is known that flat materials are finished using water- or solvent-based preparations of silicone oils, paraffins, fluorocarbon (FC) polymers and other additives that endow the finished flat material with hydrophobic effects in order that the flat material may in use be able to meet the challenge of exposures to rain, splashed water or moisture. Tent fabrics, for instance, are treated with aqueous emulsions of paraffins, metal soaps and also silicic acid salts of polyvalent metals in order that the textile surface may be rendered repellent to rain or splashed water.

Common to all these uses is that, after their treatment with the chemicals mentioned, the flat materials cannot be washed or subjected to other cleaning measures to remove any soiling. However, where the substrate is such that cleaning operations cannot be avoided, a dramatic deterioration in the water-repellent properties is always observed. This disadvantage can to some extent be compensated by refreshing the water repellency by aftertreatment with suitable hydrophobicizing agents, in which case the chemicals employed will usually have the same or similar chemical basis as the OEM finish.

On state of the art wovens, especially those composed of synthetic materials, the oil and water repellency is produced through use of water- or solvent-based FC polymers. For instance, EP-A-0 325 918 describes preparations which consist of polyurethanes modified with perfluoroaliphatic groups, and which provide good oil and water repellency on textile substrates coupled with good soft-hand and also satisfactory wash durability. EP-A-314 944 recommends formulations of FC polymers with polyethylene and modified polysiloxanes as providing a particularly smooth, soft hand.

WO 99/14422 A1 describes preparations for treatment of a fibrous substrate which, as well as FC compounds, comprise a blocked isocyanate extender, which is a reaction product of a polyisocyanate, a diol and an isocyanate-blocking agent. This blocked isocyanate extender is structurally different from component (2) claimed herein.

EP 429983 A2 describes a composition based on a perfluoroalkyl-containing polymer and an extender based on a cationically modified polyurethane which is structurally different from component (2) claimed herein.

Owing to the fact that FC formulations provide not only oil- and water-repellent effects which are durable to washing but at the same time also a good fabric hand, such compounds are currently deemed, especially with regard to use on synthetic flat materials, to be suitable products for the goal to be achieved. The disadvantage with preparations based on FC polymer is their relatively high cost, which is due to the synthesis of FC polymer involving numerous steps, some of which are energy intensive.

The altogether good overall performance level of FC polymers notwithstanding, it is to be noted that, after washing operations, there is a marked reduction in the oil- and water-repellent effect due to deorientation of the active FC moieties on the polymer molecules unless a thermal treatment is carried out to effect a reorientation. Consequently, thus treated flat materials require a heat treatment after washing in order to revitalize the desired effects. For instance, ironing or at least one tumble drying at temperatures >80° C. is a prerequisite for good regeneration of phobic properties.

SUMMARY

The present invention has for its object to prepare preparations which produce on the flat materials durable oil- and water-repellent properties by successfully utilizing the action of FC polymers, as well as a soft hand, and which, despite this successful utilization of the effect, result in commercial advantages compared with those FC polymer finishes known from the prior art. At the same time, the preparation shall be stable in storage and have essentially no emissionable constituents, especially no latently detachable formaldehyde.

The preparation to be developed shall further be capable of wholly or partly regenerating a flat material's declining oil-repellent effect with or without water-repellent effect after multiple washes when the flat material is aftertreated with the preparation.

It has now been found that, surprisingly, this object is achieved by the use of preparations which, as well as prior art FC polymers (component (1)), contain a component (2), if appropriate a polyisocyanate (component (3)) blocked by a protecting group and also, in the case of aqueous preparations, emulsifiers (component (4)) suitable for emulsification. The preparations thus obtained provide superior oil- and water-repellent properties having high durability to washing.

The successful utilization of the effect of the FC polymers provides a synergistic effect with respect to the oil- and water-repellent properties which requires substantially smaller FC polymer amounts than conventional FC polymer preparations.

DETAILED DESCRIPTION

The present invention then firstly provides preparations (Zu) based on water and/or organic solvents, characterized by the content of the following individual components:

(1) 10-90 percent by weight of a fluorine containing oil- and water-repellent agent,
(2) 10-80 percent by weight of a hydrophobic reaction product (S)
   obtainable by reacting a component (A) of the formula (I)

and/or of the formula (II)

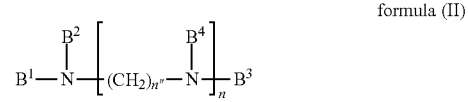

where $R^1$ is a hydrophobic residue with the meaning
—X—Y—Z or —Z, where
X is —$(CH_2)_{n''}$—,
Y is $$-O-\underset{\underset{O}{\|}}{C}- \text{ or } -O-\underset{\underset{O}{\|}}{C}-\underset{H}{N}-,$$

Z is —$(CH_2)_{m'}$—$CH_3$,
R is a residue of the composition $$-(CH_2)_n-(OCH_2CH_2)_{n'}-(OCH_2CH)_{n'}-OH,$$
$$\phantom{-(CH_2)_n-(OCH_2CH_2)_{n'}-(OCH_2CH)_{n'}-}|$$
$$\phantom{-(CH_2)_n-(OCH_2CH_2)_{n'}-(OCH_2CH)_{n'}-}CH_3$$

$R^3$ is a hydrophobic residue with the meaning —X—Y—Z—, —Z or —Y—Z, with the proviso that in the case of the —Y—Z meaning n" replaces n in the $R^2$ residue,
$R^4$ is a residue with the meaning —X—Y—Z or —$(CH_2)_n$H,
$B^1$ is a hydrophobic residue with the meaning —V—W—Z or —Z—, where
V is $$-(CH_2)_{n''}- \text{ or } -CH_2CH-,$$
$$\phantom{-(CH_2)_{n''}- \text{ or } -CH_2}|$$
$$\phantom{-(CH_2)_{n''}- \text{ or } -CH_2}CH_3$$

W is $$-O-\underset{\underset{O}{\|}}{C}-, \quad -\underset{H}{N}-\underset{\underset{O}{\|}}{C}-, \quad -\underset{\phantom{N}}{N}\diagdown\phantom{N}\diagup\underset{\phantom{N}}{N},$$

$$-\underset{H}{N}-\underset{\underset{O}{\|}}{C}-\underset{H}{N}- \text{ or } -O-\underset{\underset{O}{\|}}{C}-\underset{H}{N}-,$$

$B^2$ is $$-(CH_2CH_2O)_{n'}-(CH_2CHO)_{n'}H$$
$$\phantom{-(CH_2CH_2O)_{n'}-(CH_2CHO)_{n'}}|$$
$$\phantom{-(CH_2CH_2O)_{n'}-(CH_2CHO)_{n'}}CH_3$$

or —$(CH_2)_{n''}$—$NH_2$,
$B^3$ is a hydrophobic residue with the meaning —V—W—Z, —Z or $$-\underset{\underset{O}{\|}}{C}-Z,$$

$B^4$ is —V—W—Z or $$-\underset{\underset{O}{\|}}{C}-Z,$$

n, n', n", m and m' are integers with the meaning
n=0-2,
n'=0-4,
n"=1-4,
m=3-11, preferably
5-9, and
m'=12-26, preferably
14-22,
with a partially blocked or non-blocked di-, tri- or polyisocyanate (IC), wherein the fraction of free NCO groups is between 1.8 and 10 per mole and the ratio of free NCO groups to reactive groups in the compounds of the formulae (I) and/or (II) is in the range from 1:1 to 1:1.3,
(3) 0-45 percent by weight of a blocked or non-blocked di-, tri- or polyisocyanate, and
(4) if appropriate customary emulsifiers,
the abovementioned preparations (Zu) being free of waxes and wax mixtures.

In the case of use as a finish on flat materials the preparations endow the flat materials treated with durable oil- and water-repellent properties and also a soft hand.

All percentages relating to preparations according to the present invention are based on the overall composition of the active substances in the preparation according to the present invention and are by weight. Preferred ranges are 20-80 percent by weight and more preferably 25-65 percent by weight for component (1) and 20-80 percent by weight but especially 30-70 percent by weight for component (2). When component (3) is added, its concentration is preferably in the range of 1-35 percent by weight and especially in the range of 5-35 percent by weight. The customary use levels for the emulsifiers present if appropriate (component (4)) are preferably between 4 and 25 percent by weight and in particular between 5 and 15 percent by weight, based on the total of the active contents of the components (1), (2) and if appropriate (3) used.

Component (1) of the preparation consists of a fluorine containing oil- and water-repellent composition, in particular of FC polymers. Such FC polymers are well-known to those skilled in the art and are commercially available as ready-to-use preparations. Component (1) is prepared for example by emulsion polymerization methods as described in Houben-Weyl, "Methoden der organischen Chemie", volume E20, p. 218-268 and p. 1150 ff (1987). In general, the preparations of component (1) consist of emulsions of a linear polymer having perfluorinated alkyl side residues and are usually prepared from perfluoroalkylresidues-bearing monomers having copolymerization-capable fluorine-free monomers of different types. Methods of preparing such emulsion copolymers are described for example in DE-A-2 939 549, U.S. Pat. No. 3,544,537 and also DE-A-2 358 647.

Suitable polymers having perfluorinated alkyl side residues (component (1)) are obtained for example by emulsion copolymerization of monomers bearing perfluorinated alkyl residues, such as perfluoro-acrylate and/or -methacrylate, with fluorine-free monomers, for example butyl acrylate, stearyl acrylate, stearyl methacrylate, acrylonitrile, 2-hydroxyethyl acrylate, N-methylolacrylamide, N-methylolmethacrylamide or vinylidene chloride.

Further commercially available compositions useful as component (1) consist of emulsions comprising poly-urethanes having laterally arranged FC chains as active FC component. They are usually produced according to the customary methods of polyurethane synthesis by reacting diisocyanates with FC-groups containing dialcohols in the presence of catalyst systems based on organic tin compounds and amines, for example a combination of dibutyltin dioctoate and trimethylamine. To improve overall properties, comonomers, for example N-methyldiethanolamine, are frequently incorporated in the polyurethane polymer chain in order, for example, that a cationic charge may be generated for the FC polymer structure.

Component (1) may be prepared using if appropriate solubilizers, for example ethylene glycol, 1,2-propylene glycol, dipropylene glycol, dipropylene glycol monomethyl ether, mono- or diethylene glycol monobutyl ether. In such a case, these solubilizers may also be present in the present invention's preparation (Zu) even when based on water.

Component (2) consists of a hydrophobic reaction product (S) obtainable by reacting a component (A) as defined in the claims with a di-, tri- or polyisocyanate (IC) as defined in the claims. The component (A) compounds of the formula (I) which are used in this component (2) consist of reaction products of polyhydroxy alcohols (a1) with carboxylic acids (b1) or with alkyl isocyanates (b2). Preferred examples of polyhydroxy alcohols (a1) are glycerol, trimethylolethane, trimethylolpropane, 1,2,4-butanetriol, pentaerythritol or sugars, such as glucose for example. Particular preference thereamong is given to glycerol, trimethylolethane, trimethylolpropane, 1,2,4-butanetriol and pentaerythritol.

The component (A) compounds of the formula (II) which are used in component (2) consist of reaction products of alkanolamines (a2) and/or alkylamines (a3) with carboxylic acids (b1) or with alkyl isocyanates (b2). Examples of alkanolamines (a2) are 2-amino-2,3-propanediol, 2-amino-2-methyl-1,3-propanediol, diethanolamine, dipropanolamine, diisopropanolamine, ethanolpropanolamine, triethanolamine, triisopropanolamine, N,N,N',N'-tetrakis(2-hydroxypropyl)ethylenediamine, aminoethylethanolamine, aminopropylethanolamine, alkyltris(hydroxyethyl)propylenediamine and alkyldihydroxyethylamine having preferably 12-24 carbon atoms in the alkyl moiety, and also ethoxylation products thereof. Of these, diethanolamine, diisopropanolamine, triethanolamine, triisopropanolamine, aminoethylethanolamine and aminopropylethanolamine are particularly preferred.

Examples of alkylamines (a3) are bis(aminoethyl)amine, bis(aminopropyl)amine and their polymeric homologues, aminoethylaminepropylamine, bis(aminopropyl)ethylenediamine, tris(aminoethyl)amine, tris(aminopropyl)amine, trisaminononane, aminopropylstearylamine and aminopropylbisstearylamine. Of these, bis(aminoethyl)amine, bis(aminopropyl)amine, aminoethylaminopropylamine, bis(aminopropyl)ethylenediamine and aminopropylstearylamine are particularly preferred.

Component (A) may be prepared using mixtures of the mono- and polyhydroxy alcohols (a1) mentioned with the alkanolamines (a2) and with the alkylamines (a3).

The carboxylic acids (b1) used for preparing component (A) of the formula (I) and (II) can be saturated, linear or branch chained having 9 to 31 carbon atoms, preferably having 11-23 carbon atoms in the alkyl moiety. Examples of the saturated linear carboxylic acids used in formula (I) and (II) are capric acid, undecanoic acid, lauric acid, myristic acid, palmitic acid, stearic acid, arachidic acid and behenic acid. Of these, lauric acid, palmitic acid, stearic acid and behenic acid are particularly preferred.

The alkyl isocyanates (b2) used for preparing component (A) of the formula (I) and (II) are preferably linear and have 9-31 and especially 12-22 carbon atoms in the alkyl moiety, an example being stearyl isocyanate.

In lieu of component (A) prepared using the polyhydroxy alcohols (a1) or the alkanolamines (a2) or the alkylamines (a3) and also the carboxylic acids (b1) or the alkyl isocyanates (b2), the partially blocked or non-blocked di-, tri- or polyisocyanates (IC) can also be reacted with components having an active hydrogen atom and two hydrophobic moieties, such as for example, Guerbet alcohols, bis(dodecyl)amine and preferably bis(octadecyl)amine.

The partially blocked or non-blocked di-, tri- or polyisocyanate (IC) can also be reacted using mixtures of two compounds of the formulae (I) and (II).

If compounds of the formulae (I) and (II) are commercially available, they can be used directly for the reaction mentioned; there is then no need to make them separately.

The above-explained component (A) is reacted with the di-, tri- or polyisocyanates (IC) defined in the claims to form a product (S). Examples of di-, tri- or polyisocyanates (IC) used for conversion into partially blocked or non-blocked isocyanates are described in paras 0032 to 0037 inclusive of DE-A-100 17 651.

Particularly preferred di-, tri- or polyisocyanates (IC) are for example 2,4-tolylene diisocyanate, 2,4'-diphenylmethane diisocyanate, 4-methylcyclohexane 1,3-diisocyanate, 4,4'-diphenylmethane diisocyanate, the mixtures of monomeric diphenylmethane diisocyanates and polymeric homologs of diphenylmethane diisocyanates (polymeric MDI), tetramethylene diisocyanate, tetramethylene diisocyanate trimers, hexamethylene diisocyanate, hexamethylene diisocyanate trimers, isophorone diisocyanate, isophorone diisocyanate trimers, 2,2,4- or 2,4,4-trimethyl-1,6-hexamethylene diisocyanate and dimer diisocyanate. Dimer diisocyanate is available from Cognis Corp., 300 Brookside Avenue, Ambler, Pa. 19002, USA, under the designation of DDI 1410.

Cyclized oligo- or polyisocyanates can be prepared by known methods of cyclization as per W. Siefken (Liebigs Annalen der Chemie 562, Volume 1949, pages 75-136), for which aliphatic or cyclic oligo- or polyisocyanates can be employed. Such compounds can be prepared from the di-, tri- and polyisocyanates mentioned by linking through urethane, allophanate, urea, biuret, uretdione, amide, isocyanurate, carbodiimide, uretoneimine, oxadiazinetrione or imineoxadiazinedione structures. Preference is given to using hexamethylene diisocyanate trimers, diphenylmethane diisocyanate trimers and urethanes from 2,4-tolylene diisocyanate which still have free NCO groups.

It is also possible to react some of the isocyanate groups with polyalkoxymonoalkyl ethers using appropriate catalyst systems for assistance to form urethanes in order that the emulsifiability of component (2) in water may be improved. Polyethylene glycol monomethyl ethers having 4-20 ethylene oxide units, optionally with additional 2-6 propylene oxide units, may be used. Useful catalysts include the well-known systems based on tertiary amines and/or organotin compounds, for example dibutyltin dilaurate, dioctyltin dilaurate or dioctyltin diacetate.

As an alternative to the isocyanates modified with polyalkoxymonoalkyl ethers it is possible to use tertiary alkanolamines as additives in order that the cationic charge of the reaction products (S) and hence the self-emulsifying properties may be improved without impairing the overall properties. Dimethylaminoethanol is particularly suitable here.

When partially blocked di-, tri- or polyisocyanates (IC) are used for the reaction to form component (2), these may be partially blocked with the customary and known blocking agents, as described for example in para 0042 of DE-A-100 17 651. Preference is given to using sodium bisulphite or methyl ethyl ketoxime, but especially 3,5-dimethylpyrazole to effect partial blocking.

Partial blocking is effected by reacting the di-, tri- or polyisocyanates (IC) to be blocked with the blocking agent in the melt or in a substantially isocyanate-inert organic solvent (LM), preferably under a protective gas atmosphere and in the presence of a suitable catalyst, as described for example in EP-A-0 159 117 or DE-A-44 41 418. The ratio of the free NCO groups of the di-, tri- or polyisocyanates (IC) to be blocked to the reactive groups of the blocking agent is preferably in a stoichiometric excess up to 2:1 and preferably up to 3:1.

As suitable, inert organic solvents (LM) there are preferably anhydrous esters, for example ethyl acetate, n-propyl acetate, i-propyl acetate, n-butyl acetate, i-butyl acetate or amyl acetate.

The addition of component (3) is optional. Compounds of this type are referred to as boosters. The polyfunctionality of the polyisocyanate brings about a cross-linkage with the —OH, —COOH or —NH$_2$ groups present in most substrates and with unconverted functions of component (2), and this distinctly improves the durability to washing operations and enhances the resistance to abrasion.

Component (3) can be used in non-blocked form as well as in blocked form. The non-blocked forms of component (3) are predominantly employed in applications from aprotic media, since this avoids any unwanted, premature reaction of the free NCO groups with the reactive active hydrogen atoms of the application medium.

The non-blocked di-, tri- or polyisocyanates suitable for preparing component (3) and also the cyclized oligo- and polyisocyanates were described above in relation to the preparation of reaction product (S) in component (2).

When component (3) is to be applied to flat materials from application media which bear active hydrogen atoms, it is frequently necessary to protect the reactive NCO groups by blocking them with suitable blocking agents. In these cases, component (3) is prepared by processes wherein the complete blocking of the free NCO groups of di-, tri- or polyisocyanates is carried out with a blocking agent and in the presence or absence of an organic solvent. To achieve complete blocking, it is customary to employ a small stoichometric excess of blocking agent. When products for aqueous applications are to be prepared, the blocked di-, tri- or polyisocyanates, which may be dissolved in an organic solvent, have to be converted into emulsion form through use of suitable emulsifiers (=component (4)).

Examples of suitable customary and known blocking agents are known from para 0042 of DE-A-100 17 651 and are recited above in the description of the preparation of reaction product (S) in component (2).

There is a particular embodiment where non-blocked di-, tri- or polyisocyanates are used as boosters, but the self-emulsifiability in water of these non-blocked di-, tri- or polyisocyanates is enhanced by partial reaction of the isocyanate groups with polyalkoxymonoalkyl ethers through assistance of appropriate catalyst systems to form urethanes. The attachment of hydrophilic side chains to the di-, tri- or polyisocyanates serves to modify the HLB value of the resultant urethane such that the inherently water-insoluble compound acquires self-emulsifying properties. A certain selection of type and amount is advantageous with regard to the hydrophilic side chains. Preference is given to using between 4 and 20 ethylene oxide moieties, optionally together with 2-6 propylene oxide moieties, and these can also be present in blocks within the alkoxy chain. In the case of such mixedly alkoxylated side chains, however, the ethylene oxide fraction will always outweigh the propylene oxide fraction. Useful catalysts for the urethane synthesis include the well-known systems based on tertiary amines and/or organotin compounds, for example dibutyltin dilaurate, dioctyltin dilaurate or dioctyltin diacetate.

In use, the urethanes thus prepared spontaneously form finely dispersed emulsions in water which possess high stability to shearing forces and good compatibility with the other components of an application liquor. Owing to the reactivity of the remaining, unconverted NCO groups with water, these speciality forms have only limited pot lives of not more than 8 hours in the application liquor.

Component (3) is added especially in cases where the treated flat materials have to meet particularly high wash-stability requirements. It is then preferable to employ 5-35% of this compound, which can be used directly and without formulation auxiliaries when application is to take place from waterless solvent-borne media. For application from an aqueous medium, it is preferable to employ emulsions of component (3) which have a solids content of 15-35 percent by weight and which are prepared by using emulsifiers (=component (4)) based on ethoxylated fatty amines, optionally in quaternary form, and if appropriate other emulsifying auxiliaries, for example solubilizers based on ethylene glycol, 1,2-propylene glycol, dipropylene glycol, dipropylene glycol monomethyl ether, mono- or diethylene glycol monobutyl ether or N-methylpyrrolidone. Emulsification can be effected by means of high pressure homogenizing machines.

The preparations (Zu) according to the invention can be based on water, based on water and organic solvents and based on organic solvents.

When the preparations (Zu) of the present invention are aqueous based, the emulsifiers (=component (4)) are used. The emulsifiers (=component (4)) used for formulating components (1), (2) and if appropriate (3) of the preparations according to the present invention are known. Useful emulsifiers include for example ethoxylation products of fatty acids, fatty acid amides, fatty alcohols, fatty amines, the latter as such or in the form of their salts with low molecular weight organic acids or mineral acids and also quaternary ammonium compounds, for example cetylbenzyldimethylammonium chloride and preferably ethoxylated octadecylmethylammonium chloride. Such emulsifiers are described for example in "Römpp Lexikon Chemie" (10th edition, Volume 2, pages 1149 and 1150).

The emulsions of the component (1) are usually prepared by emulsion polymerization or by polyurethane synthesis. The emulsions of the components (2) and if appropriate (3) are prepared using the known methods of forming secondary emulsions. Typically the emulsifying temperature is above the melting range of the active substances of the employed components (2) and if appropriate (3), and preferably it is between 50 and 80° C. To produce very finely dispersed and particularly stable emulsions, a coarsely dispersed pre-emulsion is frequently prepared first, the particles of which are subsequently comminuted to the necessary average particle size between 0.1 and 10 micrometres by means of high pressure homogenizers.

If desired, the inert organic solvents (LM) added as a reaction medium for preparing the components (2) and if appropriate (3) can be distillatively removed after emulsification in order that emissionable organic hydrocarbons may be avoided.

When the present invention's preparations (Zu) are based on organic solvents, it is in particular inert organic solvents which are used, examples being ethyl acetate, n-propyl acetate, i-propyl acetate, n-butyl acetate, i-butyl acetate or amyl acetate, and no emulsifiers (=component (4)) are needed. In this case, the components (1), (2) and if appropriate (3) of the present invention's preparations are in a dissolved state in the organic solvents employed in their synthesis.

A conventional solution polymerization in esters, for example i-propyl acetate or butyl acetate or hydrocarbon mixtures having a boiling range from about 100 to 240° C., is typically carried out in this case to prepare the FC polymers (component (1)) instead of an emulsion polymerization.

Components (2) and if appropriate (3) are in this case usually prepared in inert organic solvents (LM), for example ethyl acetate, n-propyl acetate, i-propyl acetate, n-butyl acetate, i-butyl acetate or amyl acetate.

To apply the present invention's preparations (Zu) from organic solvents, the solvents used in the preparation of components (1), (2) and if appropriate (3) should be chosen such that these components' active substances dissolved in the solvents shall remain dissolved in the application solvents on further dilution.

A further aspect of the invention is a method for forming and applying preparations as described herein as a finish on flat materials, in particular on flat textile materials. Examples include wovens, formed-loop knits and prebonded nonwovens composed of natural fibres, such as wool or cotton, or synthetic fibres, especially polyester, polyamide and regenerated fibres or blends thereof.

Flat textile materials are generally treated to add-ons of 0.1-5 percent by weight and preferably 0.1-3 percent by weight of solids of the present invention's preparation based on the weight of the flat material to be treated. Typically, an aqueous liquor is forcedly applied by padding in the desired concentration at wet pick-ups of 40-100 percent by weight, subsequent predrying at 80-110° C. and a following hot treatment at 130-170° C. for 1-5 minutes. The duration of the heat treatment is in each case dependent on the temperatures employed.

The well-known exhaust process is another possible form of application to flat textile materials.

Application to flat textile materials can further be carried out by spray application, brush application or sponge application.

When used on flat textile materials, the preparations of the present invention can also be combined with textile auxiliaries customary in the textile industry. To be emphasized here are agents which improve the crease recovery, for example methylol compounds of dihydroxyethyleneurea or methylolmelamine ethers having different degrees of methylolation. Useful textile auxiliaries further include those which improve flame resistance or endow the flat material with a hand which is desired by the customer (e.g. softness, fullness or smoothness, etc.). Hand, however, can be steered in the desired direction through suitable combination of components (1) to (3) which is why in these cases there is no need to include further textile auxiliaries.

Many made-up articles are washed either in the home on household washing machines or on industrial washing machines. The latter applies particularly to the work wear of firefighters, the police, the military and other professions which frequently have to spend time outdoors and hence are exposed to the weather. The garments, typically finished to be oil, water and soil repellent, undergo a loss of these properties due to washing. These properties are therefore frequently refreshed and revitalized again through an aftertreatment with phobicizing agents. The preparations of the present invention are useful for this purpose.

The revitalizing treatment of industrially washed garments takes place in a washing or spin dryer drum by pouring a liquor of the preparations according to the present invention on the moist spun garments and subsequent tumble drying. In the case of household washing machines, the finish can be applied in the course of the customary rinse cycle or by means of a dosing ball system.

A further aspect of the invention is the use of the preparations according to the present invention as a finish on flat materials from organic solvents by drenching or dipping.

Many garments are not washed, but are subjected to cleaning in organic solvents. As in the case with the aftertreatment of washed articles, the water-repellent properties can be revitalized by refreshing with products based on the preparations of the present invention.

The revitalizing treatment of garments cleaned in organic solvents takes place in the cleaning drum of a dry cleaning machine by pouring or spraying a liquor of the preparations according to the present invention onto the solvent wet cleaned articles and subsequent removal of the solvents in a tumble dryer at elevated temperatures. The chemical identity of the cleaning agent is immaterial here, i.e. the treatment can take place not only on state of the art machines in closed systems using perchloroethylene or on those which are suitable for treatment with solvents based on hydrocarbons, an example being Isopar J.

A further aspect of the invention is the use of the preparations according to the present invention as a finish on flat materials from organic solvents by spraying.

Instead of a revitalizing treatment of flat textile materials after washing or cleaning operations by application of the present invention's preparations from continuous water-based or solvent-based liquors, the present invention's preparations can also be applied by means of various spraying methods in the consumer care sector. Offerings in this sector include phobicizing agents formulated in organic solvents and propellent gases from aerosol cans or through pump sprays. In the shoe care sector in particular an appreciable improvement in water repellency and hence in wear comfort can be achieved.

The examples which follow illustrate the invention. The finishes were applied to flat textile materials on an "RFA" LFV 350/2 laboratory pad-mangle from Benz (Switzerland) with subsequent drying and hot treatment on a TKF 15/M 350 laboratory stenter from Benz (Switzerland). Spray application was carried out in a closed hood through manual and one-sided application by means of a pump spray onto the taut flat material with subsequent drying at room temperature for 24 hours. The wet pick-up was determined by weighing out the finished test samples before and after application.

The oil- and water-repellent effects were tested not directly after application, but only after conditioning of the substrates in a standard atmosphere for 24 hours in order that influences on these properties due to over-drying may be levelled out. Add-on levels and also the conditions for the hot treatment are recited in Tables 3a and 3b together with the phobic effects to be achieved.

The water repellency was tested on the flat textile materials not only by the spray test of AATCC Standard Test Method 22 but also by means of the significantly more differentiating Bundesmann test of German industrial standard DIN 53 888. The test as per AATCC Standard Test Method 22 takes the form of spraying distilled water under controlled conditions onto the textile substrate to be tested and then visually rating the wetting pattern against pictures of an evaluation standard included in the test method. The numerical values reported are based on the appearance of the surface after spraying with water and have the following meaning:

100=No sticking of water droplets or wetting of the upper surface

90=Occasional sticking of water droplets or wetting of the upper surface
80=Wetting of the upper surface at water spray points
70=Partial wetting of total upper surface
50=Complete wetting of total upper surface
0=Complete wetting of total upper and lower surfaces (wet through).

In the more differentiating Bundesmann test of German industrial standard DIN 53 888 the textile substrate to be tested is exposed to the action of a defined artificial shower and the amount of water absorbed after a certain time is determined in percent and identified in Tables 3a and 3b as "water absorption". On the basis of experimental values, the following evaluation ranges have been determined for the appraisal of water absorption by the customary fibre varieties cotton and polyester:

|  | % water absorption | |
|---|---|---|
| Evaluation | Cotton | Polyester |
| Excellent | 5-10 | 0-1 |
| Very good | 10-15 | 1-2 |
| Good | 15-20 | 2-5 |
| Satisfactory | 20-30 | 5-10 |
| Poor | over 30 | over 10 |

A further evaluation criterion is the water bead-off effect identified as "bead-off effect" in Tables 3a and 3b. This bead-off effect is rated by visual comparison of the beshowered test samples with the pictures recited in the DIN standard, on a 5-point scale, which is defined as follows:
5=Small droplets bead-off quickly
4=Larger drops form
3=Drops stick at points on the measured sample
2=Measured sample partially surface wetted
1=Measured sample surface wetted or wet through over its entire area.

Oil repellency was tested as per AATCC Standard Test Method 118. This test evaluates the ability of the textile substrate to resist wetting by liquid hydrocarbons having different surface tensions. The test yields a rough index of the ability of a substrate to reject oily soils; the higher the rating, the better the repellency of such soils, especially with regard to oily liquids. In the test, droplets of standardized test liquids, consisting of a selected series of hydrocarbons having different surface tensions, are carefully pipetted in succession onto the surface of, the specimen to be tested and the wetting after a defined contact time is visually rated. The oil repellency value corresponds to the test liquid having the highest number that causes no wetting of the surface. The standard test liquids have the following composition:

| Oil repellency | Composition |
|---|---|
| 1 = | Nujol |
| 2 = | 65% by volume of Nujol to 35% by volume of n-hexadecane |
| 3 = | n-Hexadecane |
| 4 = | n-Tetradecane |
| 5 = | n-Dodecane |
| 6 = | n-Decane |
| 7 = | n-Octane |
| 8 = | n-Heptane |

State of the art FC polymers are currently achieving oil repellency values of 6; but a rating of 5 is usually already considered excellent.

To test the durability of finished flat materials to washing operations, the test samples were subjected to a 60° C. washing and drying procedure in accordance with EN ISO 6330: 2000 and hot-pressed for 1 minute at 120° C.

Preparation of Component (1)

The FC polymer emulsion (=component (1)) used according to Table 2 is prepared by emulsion polymerization as described in Reference Example 1 of DE-A-29 39 549. However, the compounds identified therein are modified with regard to identity and amount as described hereinbelow:

A mixture consisting of
177 grams of a compound of the formula $C_nF_{2n+1}$—$CH_2CH_2OOCCH$=$CH_2$ having an average chain length of n=8.1,
49 grams of stearyl methacrylate,
6 grams of $CH_2$=$CCH_3COOCH_2CH(OH)CH_2Cl$ and
50 grams of 1,2-propylene glycol is heated to 70° C. and turbined into a hot mixture of
460 grams demineralized water,
230 grams of 1,2-propylene glycol,
13 grams of N-methylolacrylamide 50%,
1 gram alkyl-N,N-polyoxyethyleneammonium chloride (Ethoquad HT 25 (AK-ZO)) (=component (4)) and
10 grams of an adduct or stearic acid and 14 mol of ethylene oxide (=component (4)) at 70° C. The resulting pre-emulsion is homogenized on a high pressure homogenizer, subsequently admixed with
2 grams of dodecyl mercaptan and
2 grams of azobisisobutylamidine hydrochloride and further stirred at 70° C. under a nitrogen atmosphere for 6 hours, during which the polymerization proceeds. The degree of reaction is 98% by GC analysis. The emulsion obtained contains the copolymer in an amount of 25 percent by weight.

Preparation of Component (2)
Component (A):
General Method of Making Components (A) of Formula (I) and/or (II)

This relates to columns 1-7 and 9-11 of Table 1. The components indicated in Table 1 (a1, a2 or a3) and (b1) are melted in the amounts indicated in Table 1, which are in grams, in a suitably dimensioned three-neck flask equipped with distillation condenser, adjustable stirrer and internal thermometer under protective gas and with stirring. The mixture is then heated to the end temperature (T) indicated in Table 1 and stirred until water of reaction is no longer distilled off and the acid number (SZ) reported in Table 1 is attained. If necessary, 0.1 percent by weight of sulphuric acid can be added to the esterification reactions as a catalyst. No addition of catalyst is needed in the case of the amidation reactions. The resulting condensation product is poured out, cooled down and chipped.

Particular Method of Making Components (A) of Formula (I) and/or (II) Involving the Use of Alkyl Isocyanates (b2) and Further Processing to Form Reaction Products (S)

This relates to column 12 of Table 1. A suitably dimensioned three-neck flask equipped with reflux condenser, adjustable stirrer, internal thermometer and dripping funnel is charged with the Table 1 components (a1) and (b2) in grams in isopropyl acetate solvent (LM). This is followed by the addition of 0.05 percent by weight (based on the total amount of the components) of 1,4-diazabicyclo(2,2,2)octane catalyst and stirring of the mixture at 80° C. until the NCO band in the IR spectrum had disappeared. To prepare the reaction product (S), the mixture is subsequently mixed with the amounts in grams of component (IC) which are reported in Table 1 and is stirred at 80° C. until the NCO band in the IR spectrum has disappeared.

Reaction Products (S) (=Component (2)):
General Method of Making Reaction Products (S) from a Component (A) and Partially Blocked or Non-blocked di-, tri- or Polyisocyanates (IC)

This relates to columns 1-12 of Table 1. A suitably dimensioned three-neck flask equipped with reflux condenser, adjustable stirrer, internal thermometer and dropping funnel is charged with the Table 1 components (A) and the components (IC) in the Table 1 amounts in grams in isopropyl acetate solvent (LM). This is followed by the addition of 0.05 percent by weight (based on the total amount of the components) of 1,4-diazabicyclo(2,2,2)octane catalyst and stirring of the mixture at 65° C. until the NCO band in the IR spectrum has disappeared.

Particular Method of Making the Reaction Products (S) Used in Emulsions (E) 1 and 2

This relates to columns 1 and 2 of Table 1. Emulsions (E) are prepared using reaction products (S) prepared by the Table 1 amounts (in grams) of dimethylaminoethanol being added in the course of the reaction of component (A) with the isocyanate (IC). In a particularly advantageous manner the cationogenicity and thus the exhaustion onto textile substrates and also the self-emulsifying properties of component (2) in the aqueous emulsion (E) under acidic conditions are improved by the introduction of tertiary amino groups.

General Method of Making Emulsions (E) from Component (2) or the Reaction Products (S)

Organic phase: A suitably dimensioned glass beaker is charged with the Table 1 amounts (in grams) of reaction product (S), present in the aforementioned isopropyl acetate and this initial charge is heated to 65-70° C. with stirring until a clear, homogeneous solution is present. The reaction product (S) to be used may have to be melted at 65-70° C. before use in order that a homogeneous reactant may be obtained.

Aqueous phase: The Table 1 amounts (in grams) of emulsifiers (Em) (=component (4)) are dissolved in the stated amount of water at 65° C. in a suitably dimensioned glass beaker. The two phases are stirred together by a high speed stirrer to form a coarse pre-emulsion and subsequently homogenized at 65° C. on a high pressure homogenizing machine at 300-500 bar until an average particle size between 0.1 and 10 micrometres is reached. The solvent (LM) is subsequently removed by azeotropic distillation under reduced pressure on a rotary evaporator. If appropriate, the pH of the resulting emulsion is adjusted to 5-7 with 60% acetic acid, and the resultant white emulsion is filtered through a 20 micrometre filter and adjusted with water to a solids content of 20 percent by weight.

Preparation of Component (3)

The preparation of the booster emulsions (=component (3)) used if appropriate according to Table 2 is carried out by blocking the NCO groups of an aromatic diisocyanate in isopropyl acetate, subsequent emulsification and high-pressure homogenization and distilling off the solvent fractions.

Organic phase: A suitably dimensioned three-neck flask equipped with reflux condenser, adjustable stirrer, internal thermometer and dropping funnel is charged with 125 grams (0.5 mol) of methylenediphenyl diisocyanate in 450 grams of isopropyl acetate and admixed with 87.1 grams (1 mol) of 2-butanone oxime under protective gas, the internal temperature not being allowed to exceed 70° C. The mixture is stirred at 65° C. for 2 hours, until the NCO band in the IR spectrum has disappeared.

Aqueous phase: 30 grams of alkyl-N,N-polyoxyethyleneammonium chloride (Ethoquad HT 25 (AKZO)) (=component (4)) are dissolved in 800 grams of water at 65° C. in a suitably dimensioned glass beaker. The two-phases are stirred together by a high speed stirrer to form a coarse pre-emulsion and subsequently homogenized at 65° C. on a high pressure homogenizing machine at 500 bar until an average particle size below 10 micrometres is reached. The solvent (LM) is subsequently removed by azeotropic distillation under reduced pressure on a rotary evaporator. If appropriate, the pH of the resulting emulsion is adjusted to 5-7 with 60% acetic acid, and the resultant white emulsion is filtered through a 20 micrometre filter and adjusted with water to a solids content of 20 percent by weight.

Production of Inventive Preparations (Zu)

Table 2 preparations (Zu) are prepared from components (1), (2), if appropriate (3) and if appropriate water in the stated weight ratios by simply stirring them together at room temperature.

Finishing Examples

Use of Water-Based Preparations (Zu) on Flat Textile Materials:

Finishing conditions and test results are recited in Tables 3a and 3b.

Use of Solvent-Based Preparations (Zu) on Flat Textile Materials (Not Recited in Tables 3a and 3b):

Component (1) for use from solvent is prepared by solution polymerization:

A mixture consisting of 169 grams of a compound of formula $C_nF_{2n+1}$—$CH_2CH_2OOCCH$=$CH_2$ having an average chain length of n=8.1, 50 grams of stearyl methacrylate, 2 grams of N-methylolacrylamide 50%, 35 grams of vinylidene chloride, and 2 grams of azobisisobutylamidine hydrochloride 742 grams of isopropyl acetate is heated to 50° C. and further stirred under a nitrogen atmosphere for 18 hours while the polymerization proceeds. The degree of reaction according to GC analysis is 98%. The solution obtained contains the copolymer in an amount of 25 percent by weight.

For the application, 3 grams of the copolymer thus obtained (=component (1)) are dissolved with 9 grams of the reaction product (5) (=component (2)) listed in column 4 of Table 1 in isopropyl acetate.

The solution is pump sprayed from about 30 cm against the Table 3a and 3b cotton and polyester substrates until the surfaces are uniformly wetted. The fabrics are subsequently dried at room temperature for 24 hours. The treated cotton poplin test fabrics exhibit an AATCC Standard Test Method 22 water repellency of 90 and an AATCC Standard Test Method 118 oil repellency of 4, while the woven polyester test fabrics exhibit a water repellency of 100 and an oil repellency of 5.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

TABLE 1

Preparation of component (2) and also their emulsions (E)
Amounts reported in grams

| | | | \multicolumn{12}{c}{Components} |
|---|---|---|---|---|---|---|---|---|---|---|---|---|---|---|
| | | | 1 | 2 | 3 | 4 | 5 | 6 | 7 | 8 | 9 | 10 | 11 | 12 |
| Component (A) (= precursor from (a) and (b) for reaction product (S)) | | | | | | | | | | | | | | |
| (a) | (a1) | Glycerol | — | — | — | — | — | — | 46 | — | — | — | — | 43.2 |
| | (a2) | Triethanolamine | — | 85.5 | 85.5 | 85.5 | 85.5 | 85.5 | — | — | — | — | — | — |
| | (a3) | Aminoethylaminopropylamine | — | — | — | — | — | — | — | — | — | — | 61.4 | — |
| | | Bis(aminoethyl)amine | 39 | — | — | — | — | — | — | — | 77.3 | — | — | — |
| | | Bis(aminopropyl)amine | — | — | — | — | — | — | — | — | — | 57.6 | — | — |
| (b) | (b1) | Lauric acid | — | — | — | — | — | — | — | — | — | 300 | — | 210 | — |
| | | Palmitic acid | — | — | — | — | — | — | — | 256 | — | — | — | — |
| | | Stearic acid | 214 | 330 | 330 | — | — | 330 | — | — | — | — | — | — |
| | | Behenic acid | — | — | — | 395 | 395 | — | — | — | — | 304 | — | — |
| | (b2) | Stearyl isocyanate | — | — | — | — | — | — | — | — | — | — | — | 268.1 |
| End temperature (T) in ° C. | | | 165 | 160 | 160 | 160 | 160 | 165 | 195 | — | 160 | 160 | 165 | — |
| Acid number SZ | | | <5 | <5 | <5 | <5 | <5 | <5 | <10 | — | <5 | <15 | <10 | — |
| Reaction product (S) (= comp. (2)) | | | | | | | | | | | | | | |
| Component (A) | | | 177 | 95 | 224 | 224 | 191 | 224 | 192 | — | 136 | 233 | 140 | 311.3* |
| Bis(octadecyl)amine | | | — | — | — | — | — | — | — | 120 | — | — | — | — |
| Dimethylaminoethanol | | | 12.3 | 6.15 | — | — | — | — | — | — | — | — | — | — |
| Isocyanate (IC) | 2,4-Tolylene diisocyanate/trimethylolpropane urethane with 13.5 wt% NCO | | 127 | 63.5 | — | — | 71.7 | — | 96 | 72 | 93.3 | 93.3 | — | 141.1 |
| | Hexamethylene diisocyanate trimer with 21.7 wt% NCO | | — | — | 63.5 | 55 | — | 63.5 | — | — | — | — | 60.3 | — |
| Solvent (LM) | Isopropyl acetate | | 385 | 192 | 290 | 284 | 262 | 290 | 315 | 315 | 229 | 327 | 212 | 452.3 |
| Emulsion (E) comprising components (2) and (4) | | | | | | | | | | | | | | |
| Reaction product (S) | | | 100 | 100 | 167 | 167 | 167 | 167 | 301 | 286 | 215 | 215 | 180 | 301.6 |
| Component (4) | Ethoquad HT 25 | | 0.16 | 0.16 | 0.47 | 0.47 | 0.47 | 0.47 | 1.4 | 1.3 | 1.1 | 1.1 | 2.1 | 1.4 |
| emulsifier (Em) | Disponil A 1080 | | 1.77 | 1.77 | 5.3 | 5.3 | 5.3 | 5.3 | 15.7 | 14.9 | 12.8 | 12.8 | 14.2 | 15.74 |
| | Arquad 2C75 | | 1.33 | 1.33 | 4 | 4 | 4 | 4 | 12.1 | 11.5 | 10.1 | 10.1 | 9.8 | 12.1 |
| Water | | | 133 | 133 | 233 | 233 | 233 | 233 | 449 | 426 | 329 | 329 | 290 | 450.1 |
| Acetic acid 60% | | | 1.2 | 0.6 | — | — | — | — | — | — | — | — | — | — |

*= intermediate not isolated

TABLE 2

Blend ratios of inventive preparations (Zu)

| Preparation (Zu) | Parts by weight of component (1) | Parts by weight of emulsion (E) comprising components (2) and (4) | Parts by weight of component (3) | Parts by weight of water |
|---|---|---|---|---|
| Comparative Examples | | | | |
| 1 | 100 | — | — | — |
| 2 | 50 | — | 50 | — |
| 3 | — | 100 of (E) 3 | — | — |
| 4 | — | 80 of (E) 3 | 20 | — |
| Inventive Examples | | | | |
| 5 | 40 | 50 of (E) 1 | 10 | — |
| 6 | 25 | 50 of (E) 1 | 25 | — |
| 7 | 25 | 50 of (E) 2 | 25 | — |
| 8 | 25 | 50 of (E) 2 | 15 | — |
| 9 | 40 | 20 of (E) 3 | 40 | — |
| 10 | 25 | 50 of (E) 3 | 25 | 10 |
| 11 | 15 | 70 of (E) 3 | 15 | — |
| 12 | 25 | 50 of (E) 4 | 25 | — |
| 13 | 25 | 50 of (E) 5 | 25 | — |
| 14 | 40 | 20 of (E) 6 | 40 | — |
| 15 | 25 | 50 of (E) 6 | 25 | — |
| 16 | 15 | 60 of (E) 6 | 25 | — |
| 17 | 25 | 50 of (E) 6 | — | 25 |
| 18 | 30 | 40 of (E) 7 | 30 | — |
| 19 | 20 | 60 of (E) 7 | 20 | — |
| 20 | 25 | 50 of (E) 7 | — | 25 |
| 21 | 25 | 50 of (E) 8 | 25 | — |
| 22 | 25 | 50 of (E) 9 | 25 | — |
| 23 | 25 | 50 of (E) 10 | 25 | — |
| 24 | 25 | 50 of (E) 11 | 25 | — |
| 25 | 25 | 50 of (E) 12 | 25 | — |

TABLE 3a

PAD application on 155 g/m2 cotton poplin
Test results

Amount used of preparation (Zu): 30 g/l
Wet pick-up: 80%
Drying and Curing: 2 minutes at 150° C.

|  | Comparative Examples | | | | Examples according to the invention | | | | | | | | |
| --- | --- | --- | --- | --- | --- | --- | --- | --- | --- | --- | --- | --- | --- |
| Preparation (Zu) as per Tab. 2 | 1 | 2 | 3 | 4 | 5 | 6 | 7 | 8 | 9 | 10 | 11 | 12 | 13 |
| Original | | | | | | | | | | | | | |
| AATCC Standard Test Method 22 (WR-spray test) | 100 | 100 | 90 | 90 | 100 | 100 | 100 | 100 | 100 | 100 | 100 | 100 | 100 |
| DIN 53 888 Bead-off effect (WR-Bundesmann test) | 4 | 3 | 1 | 1 | 5 | 5 | 5 | 5 | 5 | 5 | 5 | 5 | 5 |
| DIN 53 888 water absorption in % (WR-Bundesmann test) | 32 | 27 | 33 | 38 | 13 | 13 | 14 | 16 | 9.4 | 8.4 | 6.4 | 10 | 8.7 |
| AATCC Standard Test Method 118 (OR) | 3 | 4 | 0 | 0 | 5 | 5 | 6 | 6 | 5 | 7 | 6 | 6 | 6 |
| After 3 × 60° C. washes* | | | | | | | | | | | | | |
| AATCC Standard Test Method 22 (WR-spray test) | 50 | 100 | 70 | 90 | 95 | 100 | 100 | 100 | 100 | 100 | 100 | 100 | 100 |
| DIN 53 888 Bead-off effect (WR-Bundesmann test) | 1 | 3 | 1 | 1 | 3 | 4 | 5 | 4 | 5 | 5 | 5 | 5 | 5 |
| DIN 53 888 water absorption in % (WR-Bundesmann test) | 58 | 40 | 60 | 56 | 39 | 18 | 20 | 17 | 16 | 13 | 16 | 19 | 13 |
| AATCC Standard Test Method 118 (OR) | 1 | 2 | 0 | 0 | 3 | 3 | 5 | 5 | 5 | 6 | 4 | 6 | 6 |

|  | Examples according to the invention | | | | | | | | | | | |
| --- | --- | --- | --- | --- | --- | --- | --- | --- | --- | --- | --- | --- |
| Preparation (Zu) as per Tab. 2 | 14 | 15 | 16 | 17 | 18 | 19 | 20 | 21 | 22 | 23 | 24 | 25 |
| Original | | | | | | | | | | | | |
| AATCC Standard Test Method 22 (WR-spray test) | 100 | 100 | 100 | 100 | 100 | 100 | 100 | 100 | 100 | 100 | 100 | 100 |
| DIN 53 888 Bead-off effect (WR-Bundesmann test) | 4 | 5 | 5 | 5 | 5 | 4 | 5 | 5 | 5 | 5 | 5 | 5 |
| DIN 53 888 water absorption in % (WR-Bundesmann test) | 17 | 7.8 | 13 | 9.2 | 9 | 17 | 12 | 17 | 19 | 12 | 17 | 15 |
| AATCC Standard Test Method 118 (OR) | 5 | 6 | 6 | 5 | 6 | 5 | 6 | 5 | 5 | 6 | 5 | 6 |
| After 3 × 60° C. washes* | | | | | | | | | | | | |
| AATCC Standard Test Method 22 (WR-spray test) | 100 | 100 | 100 | 70 | 100 | 100 | 70 | 100 | 100 | 100 | 100 | 100 |
| DIN 53 888 Bead-off effect (WR-Bundesmann test) | 4 | 5 | 4 | 2 | 5 | 4 | 2 | 4 | 4 | 5 | 5 | 5 |
| DIN 53 888 water absorption in % (WR-Bundesmann test) | 23 | 14 | 17 | 31 | 15 | 22 | 28 | 27 | 23 | 18 | 22 | 23 |
| AATCC Standard Test Method 118 (OR) | 5 | 6 | 5 | 3 | 6 | 5 | 3 | 4 | 5 | 6 | 5 | 6 |

*= as per EN ISO 6330:2000, subsequently hot-pressed at 120° C. for 1 minute
WR= Water repellency
OR= Oil repellency TABLE 3b PAD application on one-sidedly sanded 125 g/m2 polyester fabric
Test results Amount used of preparation (Zu): 30 g/l
Wet pick-up: 60%
Drying and Curing: 2 minutes at 150° C.

|  | Comparative Examples | | | | Examples according to the invention | | | | | | | | |
| --- | --- | --- | --- | --- | --- | --- | --- | --- | --- | --- | --- | --- | --- |
| Preparation (Zu) as per Tab. 2 | 1 | 2 | 3 | 4 | 5 | 6 | 7 | 8 | 9 | 10 | 11 | 12 | 13 |
| Original | | | | | | | | | | | | | |
| AATCC Standard Test Method 22 (WR-spray test) | 100 | 100 | 90 | 90 | 100 | 100 | 100 | 100 | 100 | 100 | 100 | 100 | 100 |

TABLE 3b-continued

PAD application on one-sidedly sanded 125 g/m2 polyester fabric
Test results

Amount used of preparation (Zu): 30 g/l
Wet pick-up: 60%
Drying and Curing: 2 minutes at 150° C.

| | | | | | | | | | | | | | |
|---|---|---|---|---|---|---|---|---|---|---|---|---|---|
| DIN 53 888 bead-off effect (WR-Bundesmann test) | 4 | 5 | 1 | 1 | 5 | 6 | 5 | 5 | 5 | 5 | 5 | 5 | 5 |
| DIN 53 888 water absorption in % (WR-Bundesmann test) | 4.8 | 2.7 | 15 | 13 | 0.6 | 0.7 | 1.4 | 1.6 | 0.9 | 0.8 | 0.6 | 1.3 | 1.2 |
| AATCC Standard Test Method 118 (OR) | 4 | 5 | 0 | 0 | 5 | 5 | 6 | 6 | 5 | 6 | 6 | 6 | 6 |
| After 3 × 60° C. washes* | | | | | | | | | | | | | |
| AATCC Standard Test Method 22 (WR-spray test) | 70 | 100 | 70 | 70 | 100 | 100 | 100 | 100 | 100 | 100 | 100 | 100 | 100 |
| DIN 53 888 bead-off effect (WR-Bundesmann test) | 2 | 6 | 1 | 1 | 5 | 5 | 5 | 4 | 5 | 5 | 5 | 5 | 5 |
| DIN 53 888 water absorption in % (WR-Bundesmann test) | 12 | 5.4 | 25 | 14 | 4.1 | 2 | 1.7 | 0.8 | 1 | 1.3 | 2.7 | 1.9 | 1.4 |
| AATCC Standard Test Method 118 (OR) | 2 | 4 | 0 | 0 | 4 | 5 | 6 | 5 | 5 | 6 | 5 | 6 | 6 |

| | Examples according to the invention | | | | | | | | | | | |
|---|---|---|---|---|---|---|---|---|---|---|---|---|
| Preparation (Zu) as per Tab. 2 | 14 | 15 | 16 | 17 | 18 | 19 | 20 | 21 | 22 | 23 | 24 | 25 |
| Original | | | | | | | | | | | | |
| AATCC Standard Test Method 22 (WR-spray test) | 100 | 100 | 100 | 100 | 100 | 100 | 100 | 100 | 100 | 100 | 100 | 100 |
| DIN 53 888 bead-off effect (WR-Bundesmann test) | 5 | 5 | 5 | 5 | 5 | 5 | 5 | 5 | 5 | 5 | 5 | 5 |
| DIN 53 888 water absorption in % (WR-Bundesmann test) | 2.3 | 0.9 | 2 | 0.9 | 0.7 | 2 | 1.2 | 1 | 2.1 | 0.9 | 0.8 | 0.9 |
| AATCC Standard Test Method 118 (OR) | 4 | 6 | 6 | 5 | 6 | 5 | 6 | 5 | 4 | 5 | 5 | 6 |
| After 3 × 60° C. washes* | | | | | | | | | | | | |
| AATCC Standard Test Method 22 (WR-spray test) | 100 | 100 | 100 | 70 | 100 | 100 | 70 | 100 | 100 | 100 | 100 | 100 |
| DIN 53 888 bead-off effect (WR-Bundesmann test) | 6 | 5 | 5 | 2 | 5 | 5 | 2 | 6 | 6 | 5 | 5 | 5 |
| DIN 53 888 water absorption in % (WR-Bundesmann test) | 0.9 | 1.4 | 1.3 | 11 | 1.2 | 2.2 | 13 | 2.7 | 2.3 | 1.5 | 1.8 | 1 |
| AATCC Standard Test Method 118 (OR) | 5 | 6 | 5 | 2 | 6 | 5 | 2 | 4 | 5 | 6 | 5 | 6 |

*= as per EN ISO 6330:2000, subsequently hot-pressed at 120° C. for 1 minute
WR= Water repellency
OR= Oil repellency

The invention claimed is:

1. A composition based on water and/or organic solvents, comprising the following individual components:
   (1) 10-90 percent by weight of a fluorine containing oil- and water-repellent agent,
   (2) 10-80 percent by weight of a hydrophobic reaction product obtained by reacting a component of the formula (I)

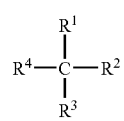

and/or of the formula (II)

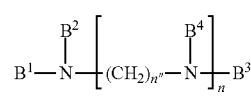

where $R^1$ is a hydrophobic residue with the meaning —X—Y—Z or —Z, where

X is —(CH$_2$)$_{n''}$—,

Y is

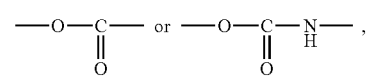

Z is —(CH$_2$)$_b$—CH$_3$, $R^2$ is a residue of the composition

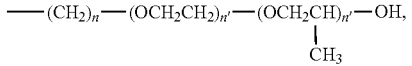

$R^3$ is a hydrophobic residue with the meaning —X—Y—Z, —Z or —Y—Z, where in a case when $R^3$ represents —Y—Z, n" always replaces n in the $R^2$ residue, $R^4$ is a residue with the meaning —X—Y—Z or —(CH$_2$)$_n$H, $B^1$ is a hydrophobic residue with the meaning —V—W—Z or —Z, where V is

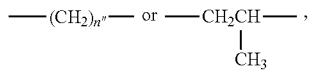

W is

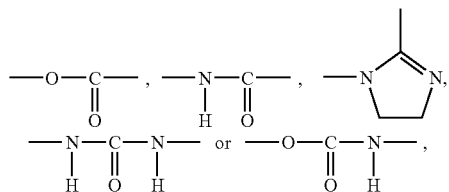

$B^2$ is

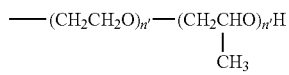

or —(CH$_2$)$_{n''}$—NH$_2$, $B^3$ is a hydrophobic residue with the meaning —V—W—Z, —Z or

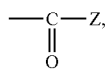

$B^4$ is —V—W—Z or

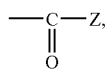

n, n', n'', m and m' are integers with the meaning
n=0-2,
n'=0-4,
n''=1-4, and
m'=12-26,
with a partially blocked or non-blocked di-, tri- or polyisocyanate, wherein the fraction of free NCO groups is between 1.8 and 10 per mole and the ratio of free NCO groups to reactive groups in the compounds of the formulae (I) and/or (II) is in the range from 1:1 to 1:1.3,
(3) 0-45 percent by weight of a blocked or non-blocked di-, tri- or polyisocyanate,
the composition being free of waxes and wax mixtures.

2. The composition of claim 1, comprising: an emulsifier.

3. The composition of claim 1, wherein the hydrophobic reaction product is obtained by reacting a component of the formula (I) with the partially blocked or non-blocked di-, tri- or polyisocyanate, wherein the fraction of free NCO groups is between 1.8 and 10 per mole and the ratio of free NCO groups to reactive groups in the compound of formula (I) is in the range from 1:1 to 1:1.3.

4. The composition of claim 1, wherein the hydrophobic reaction product is obtained by reacting a component of the formula (II) with the partially blocked or non-blocked di-, tri- or polyisocyanate, wherein the fraction of free NCO groups is between 1.8 and 10 per mole and the ratio of free NCO groups to reactive groups in the compound of formula (II) is in the range from 1:1 to 1:1.3.

5. The composition of claim 1, further comprising an organic solvent.

6. The composition of claim 1, wherein the composition comprises 5-45 percent by weight of the blocked or non-blocked di-, tri- or polyisocyanate.

7. The composition of claim 1, wherein the composition is an aqueous based emulsion comprising an emulsifier.

8. The composition of claim 7, wherein the emulsion comprises particles having an average particle size of 0.1 to 10 micrometers.

9. The composition of claim 1, wherein the composition consists essentially of an organic solvent, 10-90 percent by weight of the fluorine containing oil- and water-repellent agent, 10-80 percent by weight of the hydrophobic reaction product, 0-45 percent by weight of the blocked or non-blocked di-, tri- or polyisocyanate, and optionally an emulsifier.

10. The composition of claim 1, wherein the composition is an aqueous based emulsion consisting essentially of an emulsifier, 10-90 percent by weight of the fluorine containing oil- and water-repellent agent, 10-80 percent by weight of the hydrophobic reaction product, and 0-45 percent by weight of the blocked or non-blocked di-, tri- or polyisocyanate.

11. Method of applying a finish on a planar material, comprising:
forming the composition of claim 1; and
applying the composition as a finish on a planar material.

12. Method according to claim 11, wherein the material is a planar textile material, the method comprising:
applying the composition using PAD application or an exhaust method.

13. Method according to claim 11, wherein the material is a planar textile material, the method comprising:
applying the composition using a spray application, brush application or sponge application.

14. Method according to claim 11, wherein the material is a planar textile material, the method comprising:
applying the composition from an organic solvent by drenching or dipping or by a spray method.

15. Method according to claim 12, wherein the material is a planar textile material, the method comprising:
applying the composition as an aftertreatment of a washed textile.

* * * * *